Oct. 18, 1955  I. C. SANDBACK  2,720,814
COOKE TYPE TRIPLET OPTICAL OBJECTIVE
Filed Nov. 9, 1953
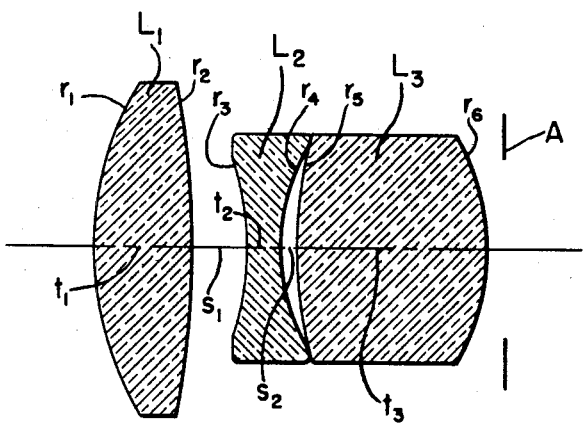
INVENTOR.
IRVING C. SANDBACK
BY
Robert F. Miehle
ATTY.

United States Patent Office 2,720,814
Patented Oct. 18, 1955

2,720,814

COOKE TYPE TRIPLET OPTICAL OBJECTIVE

Irving C. Sandback, Lincolnwood, Ill., assignor to Bell & Howell Company, Chicago, Ill., a corporation of Illinois Application November 9, 1953, Serial No. 390,914

5 Claims. (Cl. 88—57)

My invention relates to an optical objective of the Cooke triplet type in which, as it is conventionally designed, displacement of the diaphragm of the objective from its conventional position adjacent the middle or negative component of the objective to a position immediately behind the rear surface of the objective, introduces considerable distortion, unbalanced coma, and lateral color aberration, though it is desirable from the standpoint of economical quantity manufacture to locate the diaphragm in the latter position.

Objects of my invention reside in the provision of an objective of the Cooke triplet type which is corrected for spherical and chromatic aberrations, coma, astigmatism, field curvature and distortion, which permits of the diaphragm thereof being located immediately behind the rear surface of the objective, which provides a compact system, which provides satisfactory definition over a relatively wide angle of field at a relatively large aperture, and which provides, particularly by reason of the location of the diaphragm, economy in quantity manufacture.

It is to be understood that the terms "front" and "rear" as herein used refer to the ends of the objective respectively nearer the longer and shorter conjugates thereof.

In the accompanying drawing forming a part hereof, the single figure illustrates an objective embodying the invention and referring to the drawing the objective comprises three air spaced simple components of which the front and rear components, respectively designated at $L_1$ and $L_3$, are positive, and the middle component, designated at $L_2$, is negative, and preferably as shown, both the positive components are biconvex and the negative component is biconcave. Beginning with the front end of the objective, $r_1$ to $r_6$ respectively designate the optical surfaces of the components, $t_1$ to $t_3$ the axial thicknesses of the components, $s_1$ and $s_2$ the axial separations of the components, and A designates the aperture stop or diaphragm which is located immediately to the rear of the rear surface $r_6$ of the rear component.

A preferred example of the invention has an equivalent focal length of .394" and an effective aperture of f/2.5, and conforms with the following table in which dimensions are in terms of inches, and in which the indices of refraction for the D line and the Abbe dispersion numbers are respectively designated at $n_d$ and V:

| | | | | |
|---|---|---|---|---|
| $L_1$ | $r_1=+.242$ | $t_1=.074$ | $n_d=1.617$ | V=55 |
| | $r_2=-.670$ | | | |
| | | $s_1=.0415$ | | |
| $L_2$ | $r_3=-.210$ | $t_2=.025$ | $n_d=1.649$ | V=33.8 |
| | $r_4=+.1495$ | | | |
| | | $s_2=.0132$ | | |
| $L_3$ | $r_5=+.325$ | $t_3=.144$ | $n_d=1.651$ | V=55.8 |
| | $r_6=-.1682$ | | | |

Notwithstanding the requirements as to correction imposed by the location of the aperture stop or diaphragm immediately to the rear of the rear surface of the rear component of the objective, it may be and as herein described is highly corrected for spherical and chromatic aberration, coma, distortion and field curvature, and it provides a relatively large glass path, permits of a compact system with the oblique ray bundle constricted within a satisfactory diameter such that the higher order aberrations at the surface $r_3$ are cancelled by those of surface $r_6$, and provides satisfactory definition over a relatively wide angle of field, 35° in the example hereof, at a relatively large aperture, f/2.5 in the example hereof, and contributing to the performance of the objective are the following limitations:

The axial thickness $t_3$ of the rear component $L_3$ is from 35 to 40 per cent of the equivalent focal length of the objective, and the axial separation $s_2$ of the middle and rear components $L_2$ and $L_3$ is from 3 to 6 per cent of the equivalent focal length of the objective, and preferably the opposing surfaces $r_4$ and $r_5$ of the middle and rear components $L_2$ and $L_3$ are respectively concave and relatively strong and convex and relatively weak and are in marginal contact, so that a spacing ring or its equivalent between the middle and rear components is eliminated.

The front, middle and rear components $L_1$, $L_2$ and $L_3$ have equivalent focal lengths respectively in the region of 75 per cent, 33 per cent and 49 per cent of the equivalent focal length of the objective.

The radius of curvature of the front surface $r_3$ of the middle component $L_2$ is from 1.2 to 1.3 of the radius of curvature of the rear surface $r_6$ of the rear component $L_3$, and the radius of curvature of the rear surface $r_2$ of the front component $L_1$ is from 2.9 to 3.2 of the radius of curvature of the front surface $r_3$ of the middle component $L_2$.

While I have thus described my invention, I do not wish to be limited to the precise details described, as changes may be readily made without departing from the spirit of my invention, but having thus described my invention, I claim as new and desire to secure by Letters Patent the following:

1. An optical objective corrected for spherical and chromatic aberration, coma, astigmatism, field curvature and distortion, comprising three air spaced components of which the front and rear components are positive and the middle component is negative, and further characterized in that the rear component has an axial thickness of from 35 to 40 per cent of the equivalent focal length of the objective, that the middle and rear components have an axial separation of from 3 to 6 per cent of the equivalent focal length of the objective, and that the front, middle and rear components have equivalent focal lengths respectively in the region of 75 per cent, 33 per cent and 49 per cent of the equivalent focal length of the objective.

2. An optical objective corrected for spherical and chromatic aberration, coma, astigmatism, field curvature and distortion, comprising three air spaced components of which the front and rear components are biconvex and the middle component is biconcave, and further characterized in that the rear component has an axial thickness of from 35 to 40 per cent of the equivalent focal length of the objective, that the middle and rear components have an axial separation of from 3 to 6 per cent of the equivalent focal length of the objective, that the front, middle and rear components have equivalent focal lengths respectively in the region of 75 per cent, 33 per cent and 49 per cent of the equivalent focal length of the objective, that the radius of curvature of the front surface of the middle component is from 1.2 to 1.3 of the rear surface of the rear component, and that the radius of curvature of the rear surface of the front component is from 2.9 to 3.2 of that of the front surface of the middle component.

3. An optical objective corrected for spherical and chromatic aberration, coma, astigmatism, field curvature and distortion, as defined in claim 2 and further characterized in that the opposing surfaces of the middle and rear components are respectively concave and relatively strong and convex and relatively weak and are in marginal contact.

4. An optical objective corrected for spherical and chromatic aberration, coma, astigmatism, field curvature and distortion, comprising three air spaced simple components of which the front and rear components are biconvex and have their outer surfaces stronger than their inner surfaces and the middle component is biconcave and has its rear surface stronger than its front surface, and further characterized in that the rear component has an axial thickness of from 35 to 40 per cent of the equivalent focal length of the objective, that the middle and rear components have an axial separation of from 3 to 6 per cent of the equivalent focal length of the objective, that the front, middle and rear components have equivalent focal lengths respectively in the region of 75 per cent, 33 per cent and 49 per cent of the equivalent focal length of the objective, that the radius of curvature of the front surface of the middle component is from 1.2 to 1.3 of that of the rear surface of the rear component, that the radius of curvature of the rear surface of the front component is from 2.9 to 3.2 of that of the front surface of the middle component, and that the front, middle and rear components have refractive indices for the D line respectively in the region of 1.617, 1.649, and 1.651 and have dispersive indices respectively in the region of Abbe number 55, 33.8 and 55.8.

5. An optical objective corrected for spherical and chromatic aberration, coma, astigmatism, field curvature and distortion, comprising three air spaced simple components of which the front and rear components are biconvex and the middle component is biconcave, and further characterized in that said objective complies substantially with the following table in which the dimensions are in terms of inches and beginning with the front end of the objective $L_1$ to $L_3$ designate the components, $r_1$ to $r_6$ the radii of curvature of the surfaces, $t_1$ to $t_3$ the axial thicknesses, $s_1$ and $s_2$ the axial separations, $n_d$ the refractive indices for the D line, and V the Abbe dispersion numbers:

|  |  |  |  |  |
|---|---|---|---|---|
| $L_1$ | $r_1 = +.242$ | $t_1 = .074$ | $n_d = 1.617$ | $V = 55$ |
|  | $r_2 = -.670$ |  |  |  |
|  |  | $s_1 = .0415$ |  |  |
| $L_2$ | $r_3 = -.210$ | $t_2 = .025$ | $n_d = 1.649$ | $V = 33.8$ |
|  | $r_4 = +.1495$ |  |  |  |
|  |  | $s_2 = .0132$ |  |  |
| $L_3$ | $r_5 = +.325$ | $t_3 = .144$ | $n_d = 1.651$ | $V = 55.8$ |
|  | $r_6 = -.1682$ |  |  |  |

References Cited in the file of this patent

UNITED STATES PATENTS

| 2,391,114 | Aklin | Dec. 18, 1945 |
| 2,503,751 | Litten et al. | Apr. 11, 1950 |

FOREIGN PATENTS

| 481,561 | Germany | Aug. 24, 1929 |
| 306,030 | Great Britain | Oct. 17, 1929 |
| 561,156 | Great Britain | May 8, 1944 |
| 601,649 | Great Britain | May 10, 1948 |
| 1,037,274 | France | Apr. 29, 1953 |